(12) United States Patent
Antonini

(10) Patent No.: US 10,188,881 B2
(45) Date of Patent: Jan. 29, 2019

(54) CONTAINER WITH COVER

(71) Applicant: B/E Aerospace Systems GmbH, Lübeck (DE)

(72) Inventor: Marco Silvi Antonini, Krummesse (DE)

(73) Assignee: B/E AEROSPACE SYSTEMS GMBH, Lübeck (DE)

( * ) Notice: Subject to any disclaimer, the term of this patent is extended or adjusted under 35 U.S.C. 154(b) by 1004 days.

(21) Appl. No.: 14/508,136

(22) Filed: Oct. 7, 2014

(65) Prior Publication Data
US 2015/0101952 A1  Apr. 16, 2015

(30) Foreign Application Priority Data
Oct. 10, 2013 (DE) .................. 10 2013 220 478

(51) Int. Cl.
| | | |
|---|---|---|
| *A62B 25/00* | (2006.01) | |
| *A62B 7/14* | (2006.01) | |
| *A62B 18/02* | (2006.01) | |
| *B65D 43/26* | (2006.01) | |
| *A62B 9/02* | (2006.01) | |

(52) U.S. Cl.
CPC .............. *A62B 25/005* (2013.01); *A62B 7/14* (2013.01); *A62B 9/02* (2013.01); *A62B 18/02* (2013.01); *B65D 43/26* (2013.01); *B64D 2231/025* (2013.01)

(58) Field of Classification Search
CPC ......... A62B 25/005; A62B 18/02; A62B 7/14; A62B 9/02; B64D 2231/00; B64D 2231/02; B64D 2231/025
See application file for complete search history.

(56) References Cited

U.S. PATENT DOCUMENTS

| | | | |
|---|---|---|---|
| 3,647,165 A | 3/1972 | Whitla | |
| 4,481,945 A | 11/1984 | Levine | |
| 4,909,247 A | 3/1990 | Terrisse et al. | |
| 5,803,062 A | 9/1998 | Aulgur | |
| 6,318,364 B1 * | 11/2001 | Ford ................. | A62B 25/005 |
| | | | 128/204.18 |
| 6,913,016 B2 | 7/2005 | Pietrantoni | |
| 7,431,034 B2 * | 10/2008 | Westphal .............. | B64D 13/00 |
| | | | 128/204.18 |

(Continued)

FOREIGN PATENT DOCUMENTS

| | | |
|---|---|---|
| CN | 1615167 A | 5/2005 |
| CN | 101107165 A | 1/2008 |

(Continued)

OTHER PUBLICATIONS

Search Report, 2 pages, dated Jul. 6, 2016.

(Continued)

*Primary Examiner* — Timothy Stanis
(74) *Attorney, Agent, or Firm* — Donna Suchy

(57) ABSTRACT

A receptacle with at least one oxygen mask of an emergency oxygen supply device of an aircraft, said oxygen mask being located in the receptacle and said receptacle comprising an opening, through which the at least one oxygen mask can be led. The receptacle comprises at least one cover for covering the opening at least in sections, and a release device actuated by pull means for the release of the cover.

17 Claims, 6 Drawing Sheets

(56) References Cited

U.S. PATENT DOCUMENTS

| | | | |
|---|---|---|---|
| 7,789,084 B2* | 9/2010 | Rittner | A62B 7/14 128/204.18 |
| 9,027,557 B2 | 5/2015 | Dussart et al. | |
| 2003/0131850 A1 | 7/2003 | Pietrantoni | |
| 2004/0144384 A1* | 7/2004 | Martinez | A62B 25/005 128/204.29 |
| 2005/0194009 A1* | 9/2005 | Fischer | A62B 25/005 128/204.28 |
| 2007/0066132 A1 | 3/2007 | Rittner et al. | |
| 2012/0186586 A1 | 7/2012 | Gill | |

FOREIGN PATENT DOCUMENTS

| | | |
|---|---|---|
| DE | 102004026649 A1 | 1/2006 |
| DE | 102005044719 A1 | 3/2007 |
| DE | 60313111 T2 | 12/2007 |
| EP | 1 433 502 | 6/2004 |
| GB | 897531 A | 11/1959 |
| WO | WO-97/43179 | 11/1997 |

OTHER PUBLICATIONS

First Office Action of the German, dated Jun. 13, 2014.
Canada Office Action for Application No. 2,865,846 dated Jul. 25, 2017. 3 pages.
Chinese Search Report for Chinese Application 201410531636, dated Jan. 21, 2017, 1 page.
First Chinese Office Action for Application No. 201410531636.9 and machine generated translation, dated Feb. 4, 2017, 16 pages.
Second Chinese Office Action for Application No. 201410531636.9 and machine generated translation, dated Oct. 11, 2017, 18 pages.
Chinese Office Action on Application No. 201410531636.9 dated May 21, 2018. 15 pages.

* cited by examiner

CONTAINER WITH COVER

CROSS-REFERENCES TO RELATED APPLICATIONS

This application claims priority from German Patent Application No. 10 2013 220 478.7, filed Oct. 10, 2013 incorporated by reference in its entirety.

BACKGROUND

The invention relates to a receptacle with at least one oxygen mask of an emergency oxygen supply device, to a personal service unit of an aircraft with such a receptacle, as well as to an aircraft which is provided with such a personal service unit or with a receptacle.

One or more emergency oxygen supply devices are arranged in an aircraft. For example, a personal service unit, hereinafter also called a PSU (Personal Service Unit), is located in a pressure cabin for passengers, above a seat row. Apart from lighting and ventilation, oxygen masks are also arranged in this PSU, and these oxygen masks are held in the PSU by way of a closed outer cover. In the emergency case, the outer cover of the PSU is opened and the oxygen masks fall out of the PSU. Alternatively, such an oxygen supply unit can also be provided next to the PSU in so-called oxygen boxes which have suitable mask containers.

From DE 10 2005 044 719 A1, it is counted as belonging to the state of the art, to arrange the oxygen masks with the associated conduits, lanyards and likewise in a receptacle which is closed on one side by a foil. Such an arrangement has the advantage that the installation of the masks into the receptacle does not need to be effected on location in an overhead manner, but can be effected on the part of the factory. On installing the receptacle assembled on the part of the factory, the foil then is merely removed before the complete closure of the outer covering of the PSU, so that the device is ready for use It is disadvantageous with the emergency oxygen supply devices known until now, that for example all oxygen masks arranged in the PSU fall out of this PSU for example on inspecting the opening mechanism of the outer cover of the PSU. The oxygen masks thereafter have to be carefully stored away again in the personal service unit, so that the oxygen masks are able to fall out of the PSU in an orderly manner when opening the outer cover again and thus are available to the passengers in the envisaged manner. Thus in particular, one must avoid an entanglement of the oxygen masks with the flexible tubes, lanyards and likewise.

Proceeding from the initially mentioned state of the art, it is the object of the invention, to improve a receptacle of the known type with at least one oxygen mask, to the extent that the mentioned disadvantages are reduced or avoided.

SUMMARY OF THE INVENTION

According to the invention, this object is achieved by the receptacle with the features specified in claim 1. A passenger service unit and an aircraft, in which the receptacle according to the invention is arranged, are defined in claim 15 and claim 16 respectively. Advantageous designs of the invention are to be deduced from the dependent claims as well as the subsequent description and the drawing. Hereby, according to the invention, the features specified in the dependent claims and the description, in each case per se but also in a suitable combination can further form the solution according to the invention and according to the claims 1, 14 and/or 15.

The receptacle according to the invention with at least one oxygen mask of a emergency oxygen supply device of an aircraft, said oxygen mask being arranged therein, comprises an opening, through which the at least one oxygen mask can be led and at least one cover for the at least sectioned covering of the opening, and a release device actuated by pull means, for the release of the cover.

The basic concept of the invention, is to improve the storage of at least one oxygen mask in the receptacle, to the extent that the opening of the receptacle is covered by way of an additional cover, at least in a manner such that a falling of an oxygen mask out of the receptacle is also prevented when the outer cover of the PSU is opened. The oxygen mask is securely stored in the receptacle until the release device is actuated via a pull means. If the receptacle for example is arranged in a personal service unit (PSU), then the outer cover of the PSU can be opened without an oxygen mask falling downwards through the opening. Only on actuating the release device is the cover released, so that an oxygen mask can fall out of the receptacle or be removed from this. It is to be understood that the receptacle according to the invention can be arranged not only in a PSU, but can also be a part of the mask container of so-called oxygen boxes, as are typically arranged next to these independently of the PSU.

Preferably, the release device comprises means for the conduit connection of the at least one oxygen mask to an emergency oxygen supply. The actuation of the pull means thus does not only open the cover on the receptacle, but simultaneously also activates the oxygen supply, so that oxygen is led to the at least one oxygen mask.

Advantageously, the opening of the receptacle has a rectangular shape, adapted to the likewise typically rectangular shape of the outer cover in the PSU or the oxygen box. Thereby, the cover is advantageously designed in a multi-part manner. Preferably, the cover consists of a first and of a second cover section which each have a triangular shape. The rectangular shape of the opening ensures a hindrance-free dropping of the masks through the opening and the opened outer cover lying therebelow. Thereby, it is particularly advantageous to design the cover of the opening in a multi-part manner, in particular two-part manner, since a stepwise release of the opening is rendered possible by way of this, which in particular with receptacles which receive a multitude of oxygen masks, can prevent these or the flexible tubings connected thereto, the lanyards or likewise from becoming entangled when simultaneously falling through the opening.

It is preferable for the cover sections to overlap, in order to reliably close the opening of the receptacle. This with a triangular shape is advantageously effected along their longest side which roughly forms the diagonal of the rectangular opening.

According to an advantageous design of the invention, the cover or a cover section at one side is fixedly connected to the receptacle and is otherwise not connected or releasably connected. Such a fixed connection, given an intrinsically stable design of the cover can moreover be suitably effected in a hinge-like manner, so that the cover or the cover section remains on the receptacle along this fastened side, but the other part of the cover can fall down for the purpose of the release of the opening. A fixed connection to the receptacle is therefore advantageously envisaged only at one side of the cover.

Preferably, a releasable fastening is provided at a corner region of the cover or of a cover section and is preferably released via the release device actuated by pull means.

Thereby, it is usefully the case of the corner region which is arranged on the side of the cover or of the cover section, which is distanced furthest from the side which is fixedly connected to the receptacle.

If the cover consists of two or more cover sections, it is usefully to fasten the corner regions which overlap, each in a releasable manner, since the fastening can then be effected together, in particular via a common release device actuated by pull means.

According to an advantageous design of the invention, such an actuation device comprises a spring-biased bolt which is held in a biased manner via a securing element, for example via a bar amid the integration of the part of the cover which is to be fastened in a releasable manner. The securing element, for example in the form of the bar passing through a bore in the bolt, then on the one hand fixedly holds the cover in its position closing the opening and according to an advantageous further development of the invention can simultaneously form the control part of a shut-off valve which is arranged between the oxygen supply and the at least one oxygen mask. In this manner, on releasing the device, thus on removing the bar by way of the pull means, on the one hand one succeeds in the cover in the corner region being released via the bolt and on the other hand in the bolt getting from its spring-biased position into a position in which the shut-off valve is opened.

Preferably, the securing element is releasably connected to the spring-biased bolt with a non-positive and/or positive fit. The connection for example can be effected mechanically or magnetically. The securing element, thus as a pin, can be arranged transversely to the biasing direction of the spring-biased bolt. The pin and the bolt are held in their position by way of spring force. Alternatively or supplementarily, the securing element and the spring-biased bolt can at least partly be magnetic, so that the spring-biased bolt is held in its spring-biased position by way of magnetic attraction or repulsion.

Advantageously, the spring-biased bolt is designed as a control part of a shut-off valve between the oxygen supply and the at least one oxygen mask, wherein the valve passage is blocked in the spring-biased position and is open in the relaxed position. The shut-off valve can for example be formed by a rupture disc. The rupture disc is destroyed in a targeted manner by the bolt in the relaxed position of the bolt, and the feed of oxygen to the oxygen masks is released.

In a preferred embodiment, a deflection for at least one pull means and preferably designed as an eyelet is arranged on the receptacle. If the receptacle is located in a PSU above several passengers, then the pull means for actuating the release device given a sudden pressure drop, after the opening of the outer cover of the PSU, are positioned via the deflection in front of the passengers in a manner such that each passenger can simply and quickly reach at least one pull means and thus the oxygen feed and the release of the oxygen masks from the receptacle are rendered possible. The deflection point this serves for the adaptation of the position of the pull means after the opening of the outer cover of the SU or of the oxygen box. If the deflection is unreleasably arranged on the receptacle, then the force on actuating the pull means is deflected by the defection onto the release device, preferably onto the securing element. If the deflection is releasably fastened on the receptacle, then on actuating the pull means, the deflection is released from the receptacle and the pulling force acts directly on release device, preferably onto the securing element. If the pull means is designed with a lanyard, then this lanyard can be led through the deflection designed as an eyelet and thereafter be connected to the release device.

Particularly preferably, at least one pull means is formed by a pull flag and/or an oxygen mask with lanyard. The pull flag is connected to the release device via the lanyard. The pull flag can be arranged in the PSU between the outer cover of the PSU and the cover of the receptacle. When the outer cover opens in the case of an emergency, the pull flag drops out of the PSU or of the oxygen box. Passengers can pull on the pull flag and the oxygen masks are thereupon released. A pull flag due to its simple construction is easier to be arranged again back in the PSU/oxygen box for example when inspecting the release mechanism of the PSU/oxygen box. The pull flag as a whole can be arranged outside the receptacle, but it can also be arranged in regions of the receptacle which are not covered by the cover, for example by the first or the second cover section. The pull flag then falls out of the receptacle after opening the outer cover of the PSU/oxygen box.

A pull means can also be formed by an oxygen mask with a lanyard. Some passengers intuitively tend to reach for an oxygen mask rather than for a pull flag in the case of a pressure loss. Thus it is further advantageous if at least one oxygen mask firstly remains in the receptacle by way of the cover, and for example one oxygen mask as a pulls means falls out of the receptacle. This stepwise falling-out of the oxygen masks on the one hand can prevent an entanglement of the oxygen masks as well as their feed conduits and lanyards, and on the other hand this simplifies the arrangement of the few dropped-out oxygen masks back in the receptacle on inspecting the opening mechanism of the outer cover of the PSU/oxygen box.

Alternatively or supplementarily, a pull means can also be formed by an oxygen mask with a lanyard and pull flag, wherein the pull flag is connected to the oxygen mask. It is therefore possible for the passenger to pull the oxygen mask to himself by way of the pull flag and to thus actuate the release mechanism.

In a preferred embodiment, at least one pressurised oxygen vessel or an oxygen generator is arranged in the receptacle and ensures an oxygen supply to the oxygen masks arranged in the receptacle. Thus several independent oxygen supplies can be realised in an aircraft in a simple manner.

Particularly preferably, at least one cover section is designed as a two-dimensional material. A flexible material in the context of the invention for example is a two-dimensional, preferably lightweight material, wherein this material can be a foil, a net, a textile material (woven fabric or knitted fabric) or a combination thereof. The two-dimensional material must fulfil the task on the one hand of ensuring the storage of at least one oxygen mask in the receptacle until the release device is actuated. On the other hand, the two-dimensional material must be designed in a manner such that after actuation of the release device, the opening is released for the falling-out of the at least one oxygen mask. Moreover, it is advantageous for the cover which comprises at least one two-dimensional material, to have an as low as possible weight. It is indeed with an aircraft that an as lightweight as possible construction manner is advantageous.

The receptacle according to the invention is adapted in its shape and designed such that it is envisaged suitable for the arrangement in a PSU or in an oxygen box.

At least one receptacle according to the invention is arranged in a personal service unit (PSU) or oxygen box, according to the invention, which are for an aircraft and are with at least one moveable outer cover, with which receptacle at least one pull means is arranged within the PSU or the oxygen box, between the outer cover and the cover of the receptacle. The PSU/oxygen box as well as the at least one receptacle can comprise means for fastening the receptacle in the PSU/oxygen box. In the fixed position of the receptacle, its opening is directed in the direction of the outer cover of the PSU/oxygen box. During the assembly, the receptacle is firstly arranged in the PSU/oxygen box. Thereafter, according to the invention, at least one pull means is arranged between the outer cover of the PSU/oxygen box and the cover of the receptacle, in a manner such that the pull means can fall out in a direct manner when opening the outer cover. If one pulls on the pull means, then the cover of the receptacle opens due to the release of the securing pin and due to the folding away of the sections downwards on account of gravity, so that the oxygen masks can fall out of the receptacle. Alternatively or additionally, at least one pull means can be arranged within the receptacle, wherein in the direction of the outer cover of the PSU/oxygen box, it is not hindered by the cover of the receptacle from falling out of the receptacle and the PSU/oxygen box. This simplifies the assembly, storage and transport of the receptacle, since the pull means are not arranged outside the receptacle. The pull means in the closed PSU, bear on the outer cover, but then are still located at least partly in the receptacle.

BRIEF DESCRIPTION OF THE DRAWINGS

The invention is hereinafter described by way of example and by way of the embodiment examples represented in the drawing. There are shown in.

DETAILED DESCRIPTION OF THE PREFERRED EMBODIMENTS

Figure 1:
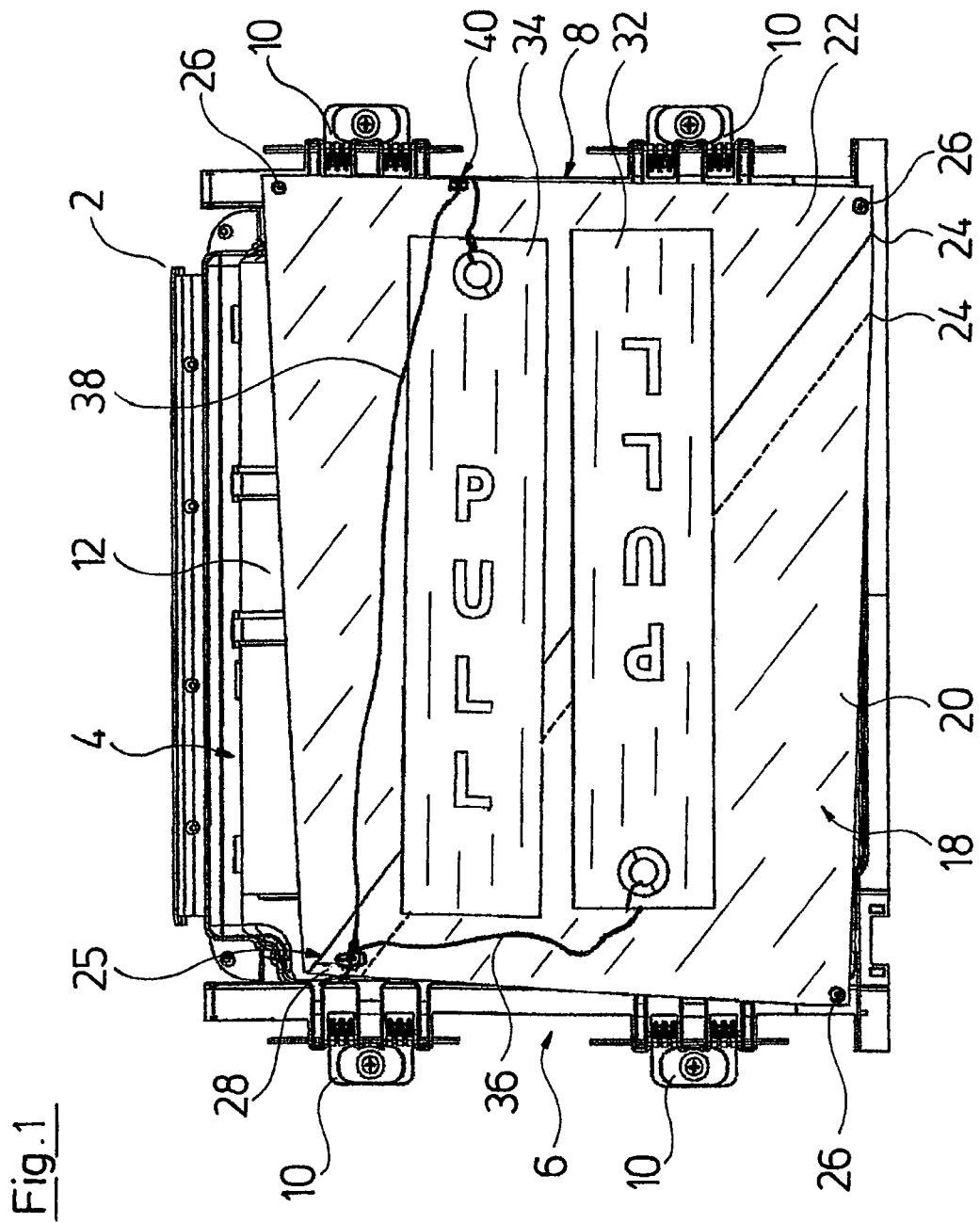
FIG. 1 is a view of a receptacle according to the invention, for the arrangement in a closed personal service unit, from below.

The receptacle 2 shown in FIG. 1 roughly has the shape of a cuboid hollow body, which at one side (at the lower side in the installed condition) comprises an opening 4. The receptacle 2 is designed to be installed in a personal service unit (PSU) (not shown in FIG. 1). For this, in each case two catch holders 10 are arranged on the two transverse sides 6, 8 of the receptacle 2 which bear on the opening 4, and these holders lock into aligned recesses when installing the receptacle 2 into the PSU. After assembly of the receptacle in the PSU, the opening 4 lies aligned to the opening in the PSU, said latter opening being located therebelow and being closed off by the outer cover 11.

An oxygen pressure vessel 12 is arranged in the receptacle 2 in a stationary manner, and four ready-to-use oxygen masks 14. An oxygen generator can also be arranged in the receptacle 2, or a connection to a central oxygen supply can be provided, alternatively to the oxygen pressure vessel 12. The oxygen masks 14 are located in pairs in the receptacle in a space-saving manner. The oxygen masks 14 each comprise a mask body 15 with the usual valves and a breathing bag 17 and are conduit-connected to the oxygen pressure vessel 12 via flexible tubes 16. A valve 13 is arranged in the receptacle 2 in the conduit connection between the oxygen pressure vessel 12 and the oxygen masks 14. In a first position of the valve 13, the valve passage and thus the oxygen conduit between the oxygen pressure vessel 12 and the oxygen masks 14 is blocked and it is open in a second position.

The opening 4 is covered by a cover 18. The cover 18 prevents the oxygen masks 14 from falling out of the receptacle 2. For this, the cover 18 comprise a first cover section 20 and a second cover section 22 which are each designed a triangular foil and are arranged on the receptacle 2 in a manner such that they overlap along their respective longest side, wherein the arising overlapping region 24 extends diagonally over the opening 4 of the receptacle 2. The second cover section 22 along the transverse side 8 of the receptacle 2 is fixedly connected to the receptacle 2 at two corners via split rivets 26. The first cover section 20 is connected along a longitudinal side to the receptacle 2 via split rivets 26.

In the overlapping region 24, in a common corner region 25, the first cover section 20 and the second cover section 22 are releasably connected to a release device 30 via a securing pin 28, wherein the release device is fixedly arranged in the container. The corner region 25 thereby bears on the transverse side and longitudinal side of the receptacle 2, which are not fixedly connected to the first cover section 20 or to the second cover section 22 via split rivets 26. The securing pin 28 thus holds the first as well as the second cover section 20, 22 on the receptacle.

The first and the second cover section 20, 22 are designed as lightweight triangular plastic foils in a manner such that they securely hold the oxygen masks 14 arranged in the receptacle 2, as well as their flexible tubes 16.

Two rectangular, longitudinally extended pull flags 32, 34 are arranged between the closed outer cover 11 of the PSU and the cover 18 of the receptacle 2, and these pull flags are connected via lanyards 36, 38 to the securing pin 28. An eyelet 40 is arranged as a deflection on the receptacle 2 on the transverse side 8 laterally of the opening 4, so that the pull flag 34 assumes a different position than the pull flag 32 on falling out of the PSU. The lanyard 38 of the pull flag 34 is led through the eyelet 40, before it ends at the securing pin 28. The eyelet 40 is releasably fastened on the receptacle 2, so that the eyelet 40 releases from the receptacle 2 on pulling on the pull flag 34.

Figure 2:
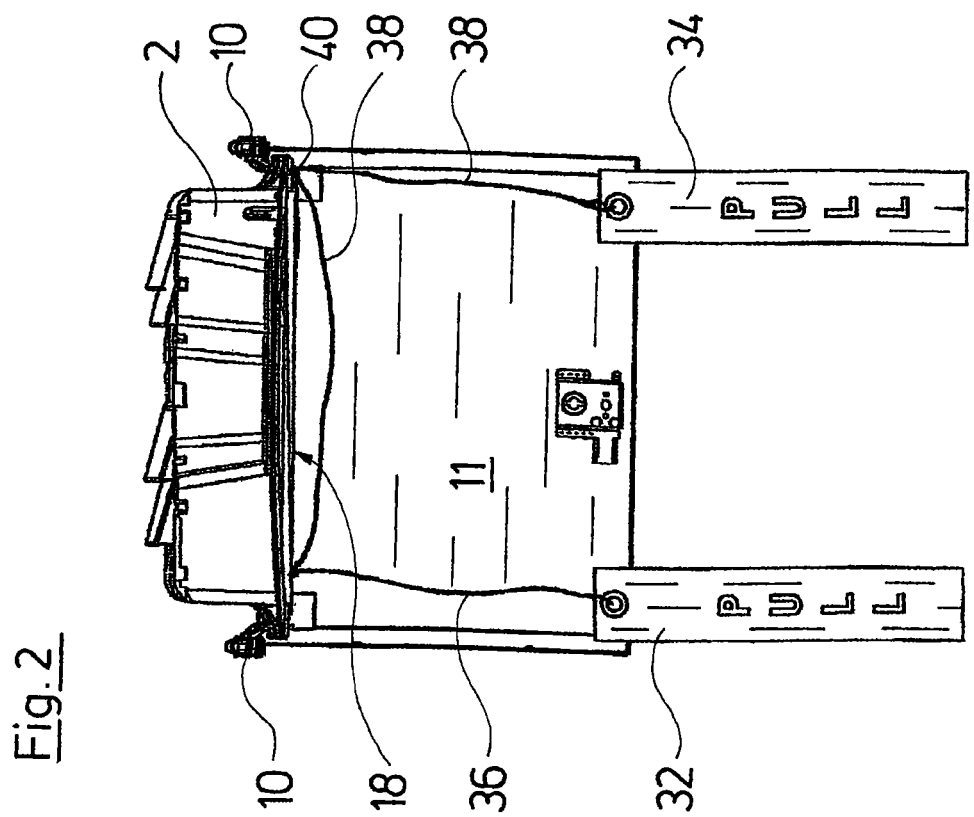
FIG. 2 is a lateral view of the receptacle according to FIG. 1, in an opened personal service unit.
Figure 3:
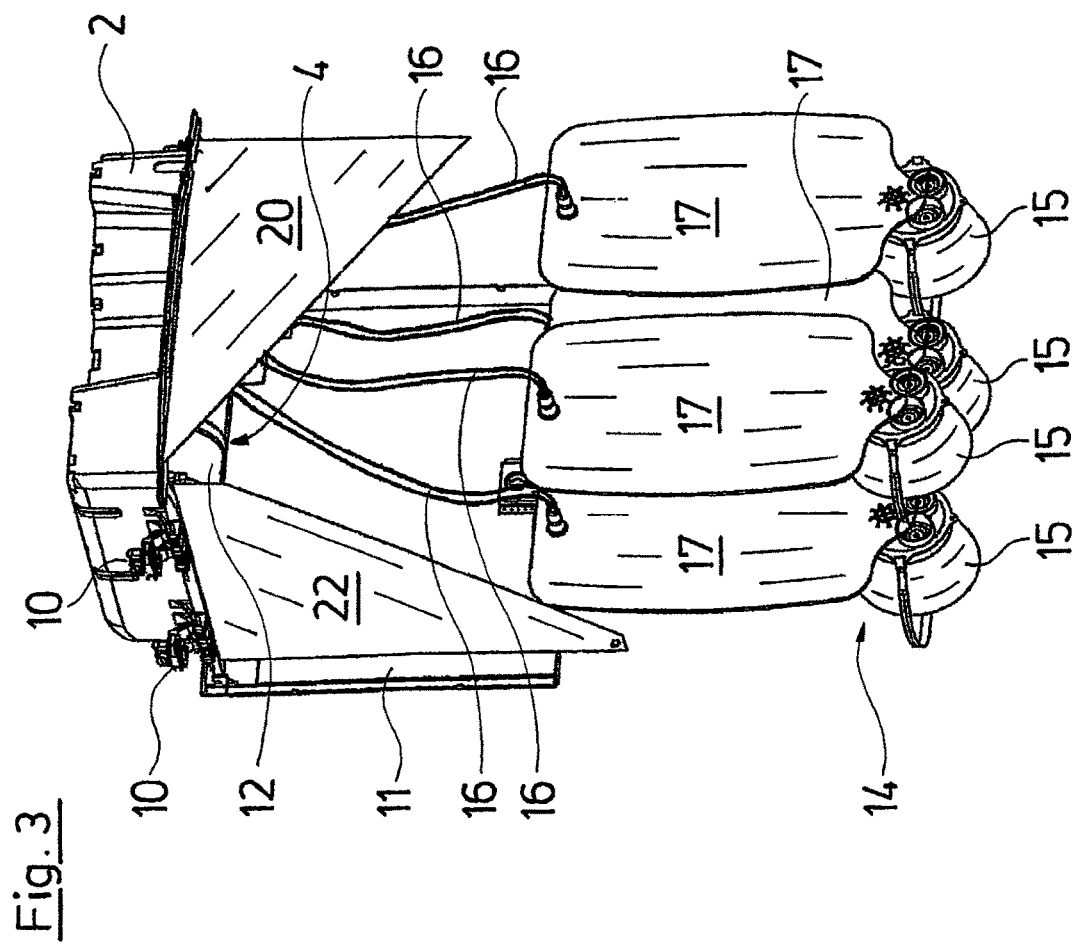
FIG. 3 is a perspective view of the receptacle according to FIG. 2, in the installed condition/opened.

If the outer cover 11 of the PSU is located its opened position 42 (FIG. 2), for example after a suddenly occurring pressure drop in the cabin, then both pull flags 32, 34 drop out of the PSU. Whereas the pull flag 32 positions itself below the securing pin 28 on account of the direct connection of the lanyard 36 to the securing pin 28, the pull flag 34 arranges itself below the eyelet 40 due to the deflection by this. If one of the two pull flags 32, 34 is pulled by a passenger, then the securing pin 28 releases from the release device 30, and the pull flags 32, 34 together with the lanyards 36, 38 as well as the with eyelet 40 and with the securing pin 28 fall further downwards due to gravity or by way of pulling. The release of the securing pin 28 from the release device 30 has the effect of the first cover section 20 and the second cover section 22 fold away downwards due to gravity, in a manner releasing the opening 4 and the oxygen masks 14 falling out of the receptacle 2, as is represented in FIG. 3. The position of the oxygen masks 14 below the receptacle thereby results from the length of the respective flexible tube 16 which is connected to the oxygen mask 14 via the breaching bag 17. The release of the securing pin 28 effects the activation by the release device 30 and thus the switching-over of the valve 13 and the release of the oxygen supply from the oxygen pressure vessel 12 to the oxygen masks 14.

Figure 4:
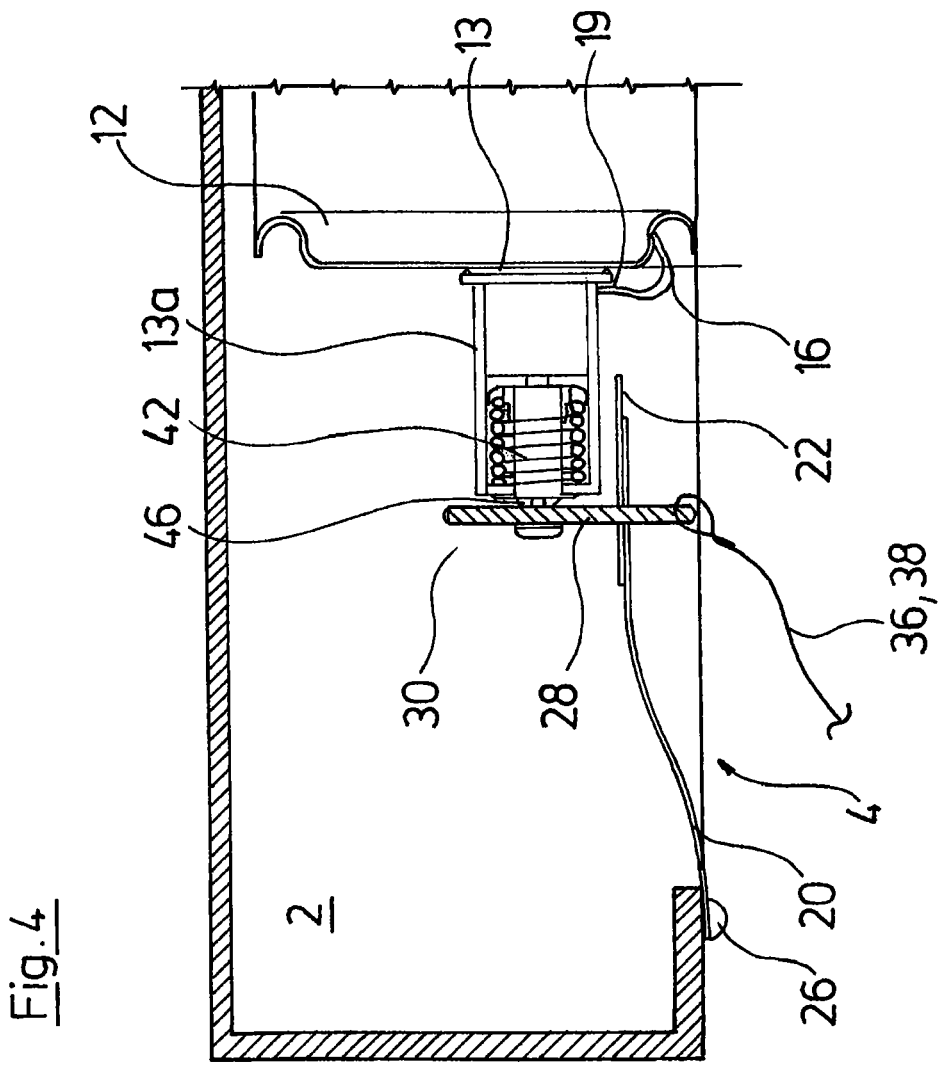
FIG. 4 is in a schematic representation, a release device in a receptacle.

One embodiment of a release device 30 is represented schematically in FIG. 4, and this is arranged in the receptacle 2 above the opening 4. The release device 30 comprises a valve 13, whose valve housing 13 a is arranged on the oxygen pressure vessel 12 at the face side. A spring-biased bolt 42 as a control part of the valve 13 is arranged in the valve 13, wherein an axial end of the bolt 42 is directed towards the oxygen pressure vessel 12 and the other free end (lying remotely opposite) comprises a transverse bore 46, through which the securing pin 28 passes. The bolt 42 is held in its spring-biased position by way of this. The valve 13 furthermore comprises a connection 19, at which the flexible tubes 16 are connected. A valve passage to the oxygen pressure vessel 12 is formed within the valve 13 in a manner such that the valve 13 is located in its first position, in which the valve passage is blocked, in the spring-biased position of the bolt 42. If the securing pin 28 is removed from the bore 46 for example by way of pulling on one of the pull flags 32, 34, then the bolt 42 is impinged by spring force and is moved into a position, in which the valve 13 is in a second position, in which the valve passage is opened. The oxygen is then led out of the oxygen pressure vessel 12 via the opened valve 13 to the flexible tubes 16 and thus to the oxygen masks 14.

Figure 5:
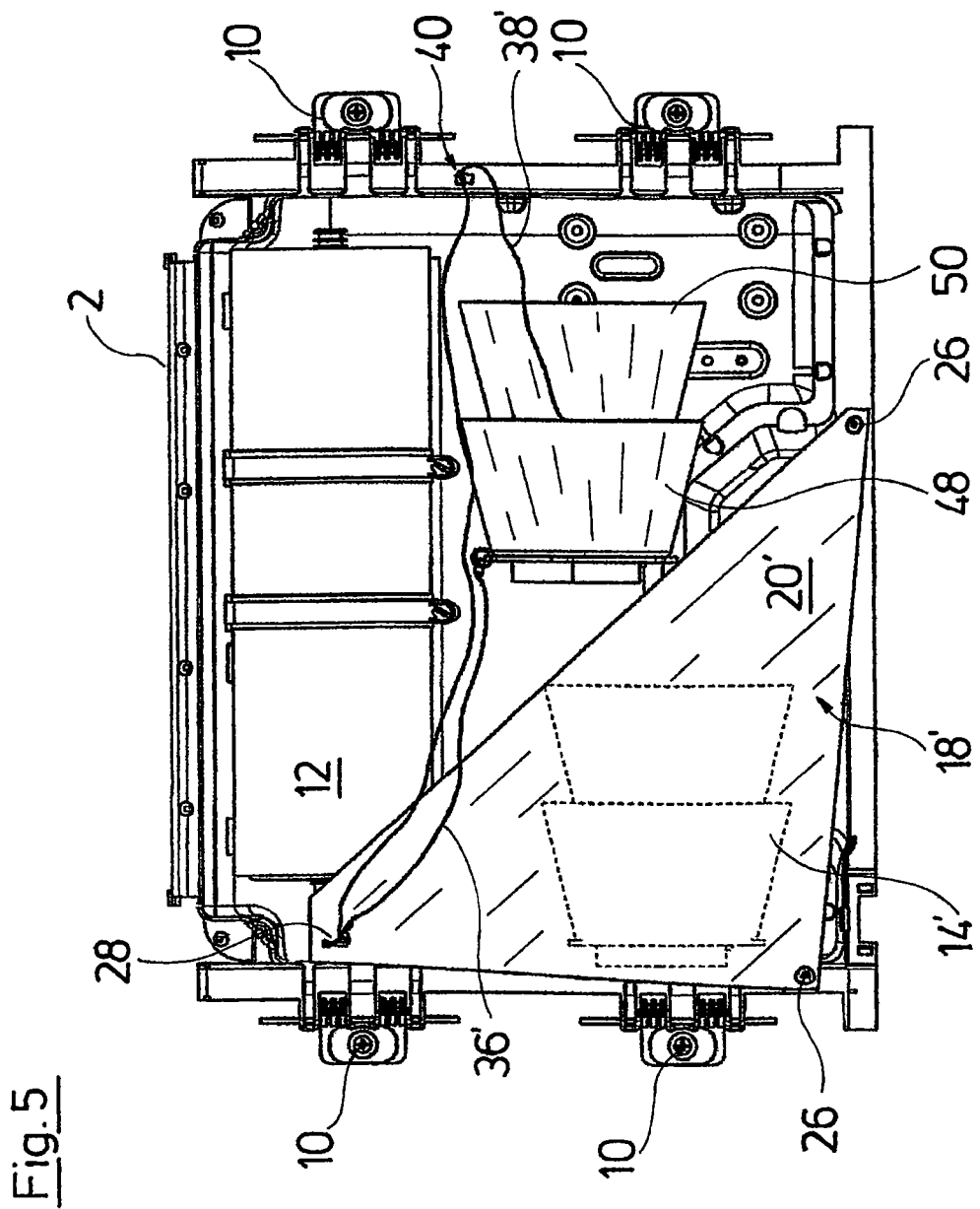
FIG. 5 is an alternative design of a receptacle in the representation according to FIG. 1.

An alternative embodiment of the cover and of the pull elements is represented in FIG. 5. The cover 18' hereby comprises only a first cover section 20' which in accordance with the preceding description is arranged on the receptacle 2 as with the cover section 20, but with respect to the cover 20 differs in its extension and thus in the covering area or surface. Thus receptacle 2 can be applied inexpensively with both covers 18, 18'. Only part of the oxygen masks 14' which are located below the first cover section 20' in the receptacle 2 are held by the cover 18'. The pull elements are formed in each case by an oxygen mask 48, 50, their flexible tubes and lanyards which are arranged in the part of the receptacle 2 which is not covered to the outside by the cover 18'. The oxygen masks 48, 50 are directly connected with their mask body 15' in each case to a lanyard 36', 38', wherein the lanyard 36' is directly connected to the securing pin 28, whereas the lanyard 38' is connected to the securing pin 28 via the deflection 40. As is the case with the oxygen masks 14', the conduit tubings 16' connect the oxygen masks 48, 50 via their breathing bags 17' to the oxygen pressure vessel 12.

Figure 6:
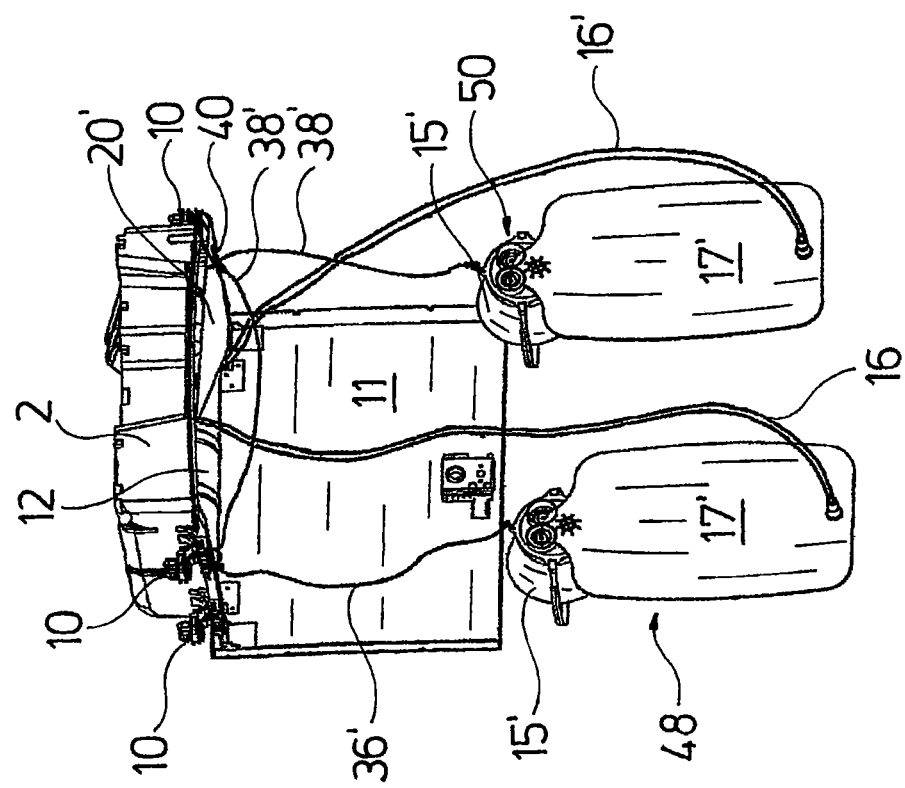
FIG. 6 is a perspective view of the receptacle represented in FIG. 5, in an opened personal service unit.

If the outer cover 11 of the PSU is opened, the two oxygen masks 48, 50 then fall out of the receptacle 2. The oxygen mask 48 hangs on the lanyard 36 below the securing pin 28, whilst the oxygen mask 50 hangs with the lanyard 38 below the deflection 40 (FIG. 6). If now a passenger pulls on an oxygen mask 48 or 50, then the securing pin 28 releases from the release device, the oxygen supply to the oxygen masks 14' and 48, 50 is activated by the valve 13, the first cover section 20' folds downwards away from the receptacle 2 due to gravity, and the oxygen masks 14' fall out of the receptacle 2. All oxygen masks 14, 48, 50 now in each case hang on their flexible tubes 16' and are ready for dispensing oxygen to the passengers.

LIST OF REFERENCE NUMERALS

2—receptacle
4—opening
6—transverse side
8—transverse side
10—catch holder
11—outer cover of the PSU
12—oxygen pressure vessel
13—valve
13a—valve housing
14, 14'—oxygen mask
15, 15'—mask body
16, 16'—two-dimensional tube
17, 17'—breathing bag
18, 18'—cover
19—connection
20, 20'—first cover section
22—second cover section
24—overlapping region
25—corner region
26—split rivet
28—securing pin
30—release device
32—pull flag
34—pull flag
36, 36'—lanyard
38, 38'—lanyard
40—eyelet
42—spring-biased bolt
46—bore
48—oxygen mask
50—oxygen mask

The invention claimed is:

1. A receptacle with at least one oxygen mask of an emergency oxygen supply device of an aircraft, the at least one oxygen mask being arranged in the receptacle, and the receptacle comprising:
    an opening, through which the at least one oxygen mask is configured to be led;
    at least one cover for covering the opening, the at least one cover including at least a first cover section and a second cover section, the opening having a rectangular shape, the at least first cover section and the second cover section having a triangular shape, the at least first cover section and the second cover section overlapping partly; and
    a release device configured to be actuated by pull means, the release device configured to release the at least one cover.

2. The receptacle of claim 1, wherein the release device comprises means for a conduit connection of the at least one oxygen mask to an oxygen supply.

3. The receptacle of claim 1, wherein the at least first cover section and second cover section overlap along a respective longest side of the at least first cover section and second cover section.

4. The receptacle of claim 1, wherein the release device comprises a spring-biased bolt having a relaxed position and a biased position, and the pull means is releasably connected via a securing element to the spring-biased bolt, the securing element configured to hold the spring-biased bolt in the biased position.

5. The receptacle of claim 4, wherein the securing element is releasably connected with a positive fit to the spring-biased bolt.

6. The receptacle of claim 4, wherein the spring-biased bolt is configured to control a shut-off valve between an oxygen supply and the at least one oxygen mask, wherein a valve passage of the shut-off valve is blocked in a spring-biased position and is opened in a relaxed position.

7. The receptacle of claim 1, wherein a deflection comprising an eyelet of the pull means is arranged on the receptacle.

8. The receptacle of claim 1, wherein the pull means comprises a pull flag.

9. The receptacle of claim 1, wherein at least one oxygen pressure vessel or an oxygen generator is arranged in the receptacle and is configured to ensure oxygen supply.

10. The receptacle of claim 1, wherein at least one of the at least first cover section and the second cover section includes a two-dimensional material.

11. The receptacle of claim 1, wherein the receptacle is configured to be arranged in a personal service unit (PSU).

12. The receptacle of claim 1, further comprising at least one movable outer cover of a personal service unit, wherein the pull means is arranged within the personal service unit between the outer cover and the at least one cover of the receptacle.

13. The receptacle of claim 1, wherein the pull means comprises an oxygen mask with a lanyard.

14. A receptacle with at least one oxygen mask of an emergency oxygen supply device of an aircraft, the at least one oxygen mask being arranged in the receptacle, the receptacle comprising:
an opening through which the at least one oxygen mask is configured to be led;
at least one cover for covering the opening, the at least one cover including at least a first cover section and a second cover section, the at least first cover section and the second cover section commonly fastened on the receptacle by a release device at a corner region at which the at least first cover section and second cover section overlap; and
the release device configured to be actuated by pull means, the release device configured to release the at least one cover.

15. An aircraft with at least one emergency oxygen supply device, wherein at least one receptacle is arranged in the aircraft, the at least one receptacle comprising:
an opening through which at least one oxygen mask is configured to be led;
at least one cover for covering the opening, the at least one cover including at least a first cover section and a second cover section, the at least first cover section and the second cover section commonly fastened on the receptacle by a release device at a corner region at which the at least first cover section and second cover section overlap; and
the release device configured to be actuated by pull means, the release device configured to release the at least one cover.

16. The aircraft of claim 15, further comprising at least one movable outer cover of a personal service unit, wherein the pull means is arranged within the personal service unit between the outer cover and the at least one cover of the receptacle.

17. The aircraft of claim 15, wherein the at least one cover includes a two-dimensional material.

* * * * *